(12) United States Patent
Van der Sijde et al.

(10) Patent No.: US 11,223,814 B2
(45) Date of Patent: Jan. 11, 2022

(54) IMAGING OPTICS FOR ONE-DIMENSIONAL ARRAY DETECTOR

(71) Applicant: Lumileds LLC, San Jose, CA (US)

(72) Inventors: Arjen Gerben Van der Sijde, Eindhoven (NL); Nicola Bettina Pfeffer, Eindhoven (NL); Frans Hubert Konijn, Huizen (NL); Erno Fancsali, Heusden-Zolder (BE)

(73) Assignee: Lumileds LLC, San Jose, CA (US)

( * ) Notice: Subject to any disclaimer, the term of this patent is extended or adjusted under 35 U.S.C. 154(b) by 0 days.

(21) Appl. No.: 16/694,077

(22) Filed: Nov. 25, 2019

(65) Prior Publication Data

US 2020/0382759 A1  Dec. 3, 2020

Related U.S. Application Data

(60) Provisional application No. 62/853,509, filed on May 28, 2019.

(51) Int. Cl.
*H04N 5/225* (2006.01)
*H04N 13/218* (2018.01)
(Continued)

(52) U.S. Cl.
CPC ........ *H04N 13/218* (2018.05); *H04N 5/2252* (2013.01); *H04N 13/254* (2018.05); *H04N 13/296* (2018.05)

(58) Field of Classification Search
None
See application file for complete search history.

(56) References Cited

U.S. PATENT DOCUMENTS

| 4,258,395 A | * | 3/1981 | Nodov | ..................... H04N 1/10 358/494 |
| 4,731,666 A | * | 3/1988 | Csesznegi | ............ G11B 31/006 348/207.99 |

(Continued)

FOREIGN PATENT DOCUMENTS

TW     202120990 A     6/2021

OTHER PUBLICATIONS

"International Application Serial No. PCT/US2020/034914, International Search Report dated Sep. 18, 2020", 4 pgs.

(Continued)

*Primary Examiner* — Mohammad J Rahman
(74) *Attorney, Agent, or Firm* — Schwegman Lundberg & Woessner, P.A.

(57) ABSTRACT

In an imaging system, a lens can redirect light from an illuminated portion of a scene toward a one-dimensional focus that is positioned in a focal plane of the lens and is elongated in an imaging dimension. The redirected light can include first light that emerges from the lens and second light that emerges from the lens. A reflector positioned adjacent the lens can reflect the second light to form third light. A linear array of detector pixels can extend along the imaging dimension and can be positioned at the focal plane proximate the one-dimensional focus to receive the first light from the lens and receive the third light from the reflector. A processor can obtain one-dimensional image data from the detector pixels for sequentially illuminated portions of the scene and construct data representing an image of the full scene from the one-dimensional image data.

19 Claims, 11 Drawing Sheets

(51) Int. Cl.
*H04N 13/254* (2018.01)
*H04N 13/296* (2018.01)

(56) References Cited

U.S. PATENT DOCUMENTS

| | | | | |
|---|---|---|---|---|
| 5,357,101 | A | 10/1994 | Plesko | |
| 5,515,394 | A * | 5/1996 | Zhang | H01S 3/0941 |
| | | | | 372/101 |
| 5,606,174 | A * | 2/1997 | Yoshimura | G01B 11/24 |
| | | | | 250/559.22 |
| 5,862,425 | A * | 1/1999 | Aoki | H04N 9/04557 |
| | | | | 396/429 |
| 5,923,021 | A * | 7/1999 | Dvorkis | G06K 7/10742 |
| | | | | 235/455 |
| 7,357,513 | B2 * | 4/2008 | Watson | G03B 21/2033 |
| | | | | 353/31 |
| 7,956,340 | B2 | 6/2011 | Vonmetz et al. | |
| 8,953,084 | B2 * | 2/2015 | Kamath | H04N 5/2253 |
| | | | | 348/335 |
| 10,535,122 | B2 * | 1/2020 | Sokeila | G06T 5/005 |
| 2003/0086179 | A1 * | 5/2003 | Kowarz | H04N 9/3105 |
| | | | | 359/627 |
| 2007/0040035 | A1 * | 2/2007 | Kotlarsky | G06K 7/10683 |
| | | | | 235/462.45 |
| 2009/0001169 | A1 | 1/2009 | Vinogradov | |
| 2009/0108066 | A1 * | 4/2009 | Tien | A61B 1/05 |
| | | | | 235/462.01 |
| 2010/0245650 | A1 * | 9/2010 | Kreysar | G01J 3/0208 |
| | | | | 348/311 |
| 2013/0182443 | A1 * | 7/2013 | Holder | F21V 7/04 |
| | | | | 362/299 |
| 2016/0018328 | A1 * | 1/2016 | Kim | G01N 21/9501 |
| | | | | 356/237.5 |
| 2017/0176596 | A1 | 6/2017 | Shpunt et al. | |
| 2017/0299958 | A1 * | 10/2017 | Kawasumi | G03B 21/005 |
| 2017/0363845 | A1 | 12/2017 | Bortolussi | |
| 2019/0035062 | A1 * | 1/2019 | Sokeila | G06T 5/50 |
| 2019/0152598 | A1 * | 5/2019 | Xie | B64D 47/04 |
| 2020/0045297 | A1 * | 2/2020 | Van Der Sijde | H04N 13/271 |
| 2020/0191966 | A1 * | 6/2020 | Chen | G01S 17/66 |

OTHER PUBLICATIONS

"International Application Serial No. PCT/US2020/034914, Written Opinion dated Sep. 18, 2020", 7 pgs.

* cited by examiner

IMAGING OPTICS FOR ONE-DIMENSIONAL ARRAY DETECTOR

CROSS-REFERENCE TO RELATED APPLICATION

This application claims the benefit of U.S. Provisional Application No. 62/853,509, filed on May 28, 2019, and entitled "Imaging Options for One-Dimensional Array Detector," which is hereby incorporated by reference in its entirety.

TECHNICAL FIELD

The present disclosure relates to imaging optics.

BACKGROUND

There is an ongoing effort to improve three-dimensional imaging, such as for use with moving vehicles. For example, industrial robots, consumer robots, automotive vehicles, drones, and other moving vehicles can benefit from improved three-dimensional imaging.

Figure 1:
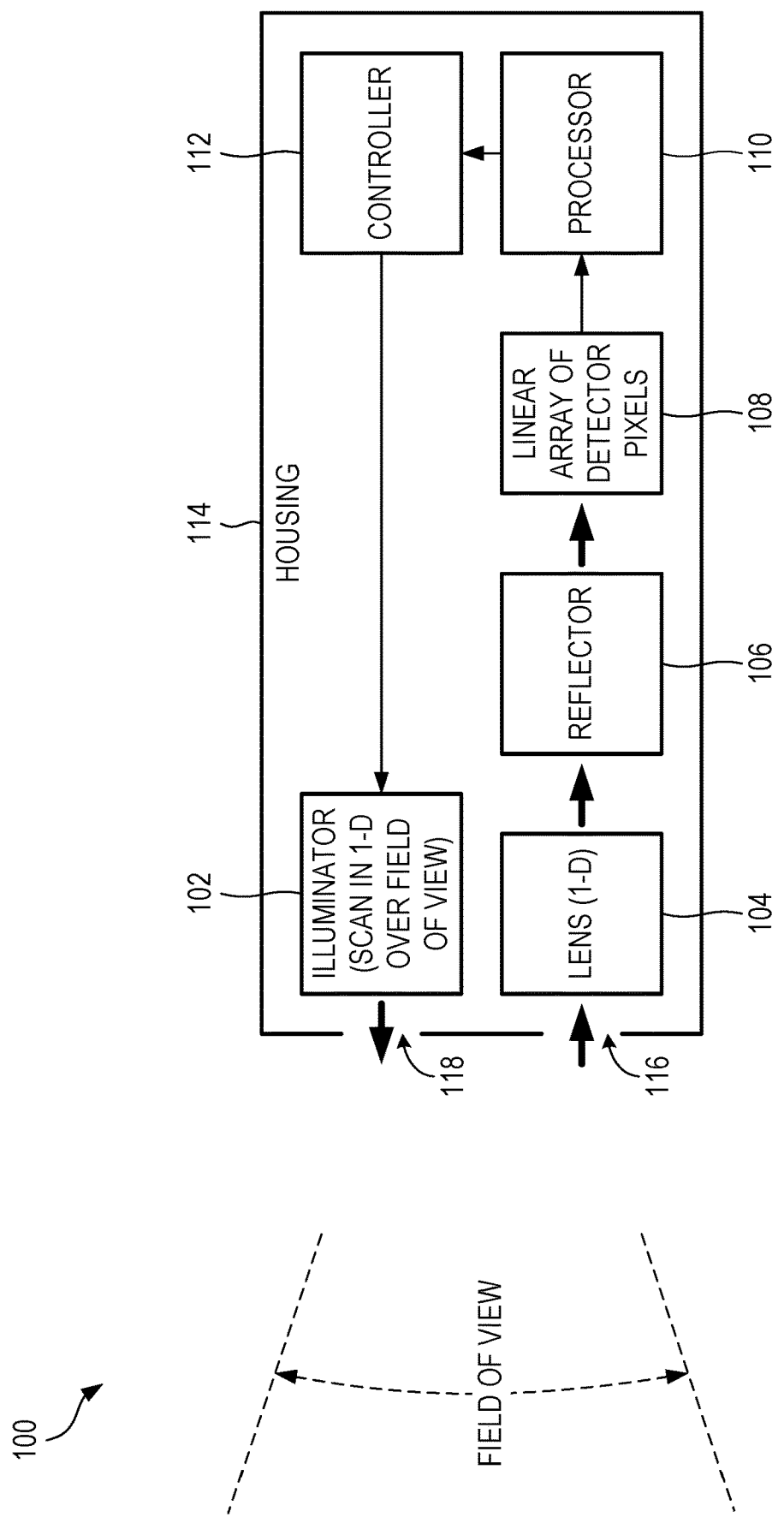
FIG. 1 shows a block diagram of an example of an imaging system, in accordance with some embodiments.

Corresponding reference characters indicate corresponding parts throughout the several views. Elements in the drawings are not necessarily drawn to scale. The configurations shown in the drawings are merely examples, and should not be construed as limiting the scope of the disclosed subject matter in any manner.

DETAILED DESCRIPTION

In an imaging system, a lens can redirect light from an illuminated portion of a scene toward a one-dimensional focus that is positioned in a focal plane of the lens and is elongated in an imaging dimension. The redirected light can include first light that emerges from the lens and second light that emerges from the lens. A reflector positioned adjacent the lens can reflect the second light to form third light. A linear array of detector pixels can extend along the imaging dimension and can be positioned at the focal plane proximate the one-dimensional focus to receive the first light from the lens and receive the third light from the reflector. A processor can obtain one-dimensional image data from the detector pixels for sequentially illuminated portions of the scene, and construct data representing an image of the full scene from the one-dimensional image data.

Such an imaging system, including the linear array of detector pixels that capture the one-dimensional focus, is well-suited to capture images of objects that can be positioned at variable distances from the imaging system.

The imaging system discussed herein can have different image quality in different directions. In one direction (e.g., along the array), the imaging optics can have a relatively high image quality to project a sharp image. In the other direction (e.g. orthogonal to the array), there is less need to maintain a sharp image, and the imaging constraints can be relaxed.

Lenses are often designed with a compromise between high image quality and efficient light collection; it can be difficult or impossible to do both simultaneously. For the imaging optics discussed below, the imaging optics can be designed to provide high image quality along one direction, and efficient light collection along the orthogonal direction. In the orthogonal direction, non-imaging design principles can provide a high light throughput, which can provide an improved signal-to-noise ratio, and/or can increase a maximum detectable distance range in practice. Although the following describes the imaging optics in terms of light detection, the optical path can be reversed, so that the imaging optics can optionally additionally provide light emission, such as for a projector.

FIG. 1 shows a block diagram of an example of an imaging system 100, in accordance with some embodiments. The configuration of FIG. 1 is but one example of an imaging system 100; other suitable configurations can also be used.

The imaging system 100 can be used to capture a video image and/or one or more static images of a scene. The scene can be a specified distance away from the imaging system 100. In some examples, the scene can reside within a specified range of distances away from the imaging system 100.

In some examples, the scene can reside within a field of view of the imaging system 100. For example, the imaging system 100 can capture light arriving at the imaging system 100 within a specified range of incident angles at the imaging system 100. The specified range of incident angles can correspond to a detection field of view of detection optics within the imaging system 100. Illumination optics within the imaging system 100 can also have an illumination field of view, corresponding to an angular range, that can receive illumination from the illumination optics. In some examples, the illumination field of view can match, or approximately match, the detection field of view, so that all parts of a scene within the detection field of view are illuminated, and little or no illumination is wasted on scene elements that may be outside the detection field of view. In some examples, the scene can reside within the detection field of view of the imaging system 100. In some examples, the scene can reside within the illumination field of view of the imaging system 100.

Unlike a typical imaging system that uses an illuminator to simultaneously illuminate all portions of a scene and a camera to capture an image of the scene all at once, the imaging system 100 discussed herein can sequentially illuminate portions of the scene, capture light reflected from each portion, and combine the data obtained from the portions to assemble a full image of the scene.

There are some applications that can benefit from obtaining the image data sequentially from the portions of the scene, rather than from the full scene all at once. For example, if an illuminator can produce only a specified amount of optical power, it can be beneficial to concentrate the power in a relatively small area of the scene, scan the concentrated power over the full area of the scene in time, and capture image data over time that corresponds to the illuminated portion of the scene.

While it is possible to perform such scanning of the scene in two-dimensions, such as by directing all the returned light onto a single detector element (e.g., a single detector pixel), the present imaging system 100 can instead scan the illumination in one direction and direct the returned light onto a linear array of detector elements. In this one-dimensional scanning technique, the lens in the detection optics can focus the returned light along a single direction. Along the imaging dimension, the lens can perform conventional imaging and can form a one-dimensional focus onto the linear array of detector pixels. In the dimension orthogonal to the imaging dimension, referred to as a collection dimension, the lens in the detection optics can collect as much light as is possible, or practical, and direct the collected light onto a respective detector element in the linear array. Along the collection dimension, the lens in the detection optics may not form an image on the linear array of detector pixels.

In FIG. 1, a relatively thick arrow indicates that an optical signal (e.g., a light beam, reflected light, and the like) is being passed to or from an element. In FIG. 1, a relatively narrow arrow indicates that an electrical signal is being passed to or from an element.

An illuminator 102 can selectively illuminate a portion of a scene. The illuminated portion can occupy less than a full field of view, such as the illumination field of view and/or the detection field of view. In some examples, the illuminator 102 can include one or more light-emitting elements, such as an array of light-emitting diodes. In some examples, the light-emitting diodes can be switched on and off selectively, so that during operation, only a subset of the light-emitting diodes are energized. The illuminator 102 can further include an illumination lens, which can have a focal plane generally coincident with the array of light-emitting diodes. For such an arrangement, the illumination lens can collimate the light from each light-emitting diode, and can direct the collimated light along a specified direction that depends on the location of the light-emitting diode in the array. In some examples, the illumination lens can direct light from each light-emitting diode in unique directions toward the scene. Alternatively, the illuminator 102 can include one or more light-producing elements (such as one or more light-emitting diodes), one or more collimating lenses that collimate the light from the one or more light-producing elements, and one or more actuators that can impart a lateral motion between the light-producing elements and the collimating lenses. Such a lateral motion can scan the illumination across the scene as needed. Alternatively, or in addition, the illuminator 102 can include one or more groups of light-emitting diodes that are sequentially powered, so that the light emerging from the illuminator 102 can effectively scan across the scene.

In some examples, the scanning can be performed purely linearly. Specifically, the illuminator 102 can illuminate a line of the scene, and then scan the line across the scene along a direction generally orthogonal to the line. In other examples, the scanning can include other, less regular, patterns. For example, the illumination can sequentially illuminate one or more contiguous or non-contiguous areas in the scene. In general, the contiguous or non-contiguous areas can be arranged such that averaged over a line generally orthogonal to the array of detector elements, the non-contiguous areas can have a same amount of optical power directed onto each detector element. Arranging the contiguous or non-contiguous areas in this manner can most effectively use a full dynamic range of the detector elements. Other suitable scanning configurations can also be used.

A lens 104 can redirect light from an illuminated portion of the scene toward a one-dimensional focus that is positioned in a focal plane of the lens 104 and is elongated in an imaging dimension. In the examples discussed herein and shown in the figures, the imaging dimension is along the X-axis. The imaging dimension is denoted as X purely for convenience, and other naming conventions could also be used. The lens 104 can be formed from any suitable optical glass, optical plastic, or optical crystal material. FIGS. 2 through 10, discussed below, show an example of a lens in detail.

A reflector 106 can be positioned adjacent the lens 104, such extending from a perimeter of the lens 104 to a perimeter of a linear array of detector elements. The reflector 106 can reflect, onto the detector elements, light from the lens 104 that would otherwise miss the detector elements. FIGS. 2 through 10, discussed below, show an example of a reflector in detail.

A linear array of detector pixels 108 can extend along the imaging dimension (X). The linear array of detector pixels 108 can be positioned at or near the focal plane proximate the one-dimensional focus to receive light from the lens 104 and from the reflector 106.

A processor 110 can obtain one-dimensional image data from the linear array of detector pixels 108 for each illuminated portion of the scene. The processor 110 can construct data representing an image of the scene from the one-dimensional image data for the corresponding illuminated portions of the scene. The processor 110 can include hardware, such as a dedicated circuit board, software, such as image processing software, or a combination of hardware and software. The processor 110 can optionally communicate with one or more other processors or servers, through a wired or wireless connection.

A controller 112 can be coupled to the processor 110 and can cause the illuminator 102 to sequentially illuminate a plurality of portions of the scene. In some examples, the controller 112 can receive data from the processor 110 regarding which light-emitting diodes of the illuminator 102 to switch on or off. The controller 112 can convert the received data into electrical signals that can selectively power desired light-emitting diodes in the illuminator 102. In some examples, the controller 112 can cause the illuminator 102 to sequentially illuminate a plurality of portions of the scene by selectively powering specified light-emitting diodes in the array of light-emitting diodes.

A housing 114 surrounds some or all components of the imaging system 100. In some examples, the housing 114 can include an aperture 116 that forms an aperture stop for the lens 104 in the imaging dimension. In some examples, the aperture 116 can be elongated in a dimension generally orthogonal to the imaging dimension. The housing 114 can also include an illumination aperture 118, through which light from the illuminator 102 passes. The housing 114 can be configured as all or a part of a smart phone, a laptop computer, a module that can be attached to or included with a vehicle, or another suitable configuration. In the specific example discussed in detail below with regard to the imaging optics, the housing 114 can mechanically support the lens 104, the reflector 106, and the linear array of detector pixels 108, with the other elements of the system being disposed outside the housing 114. Other suitable configurations can also be used. FIGS. 2 through 10, discussed below, show an example of a housing in detail.

FIGS. 2 through 10, discussed below, show a specific example of an imaging system 200 that includes a lens 202, a reflector 204, and a housing 206, in accordance with some embodiments. It is most convenient to discuss these figures in parallel, with the discussion highlighting which of the figures are most suitable for the element or aspect being discussed.

Figure 2:
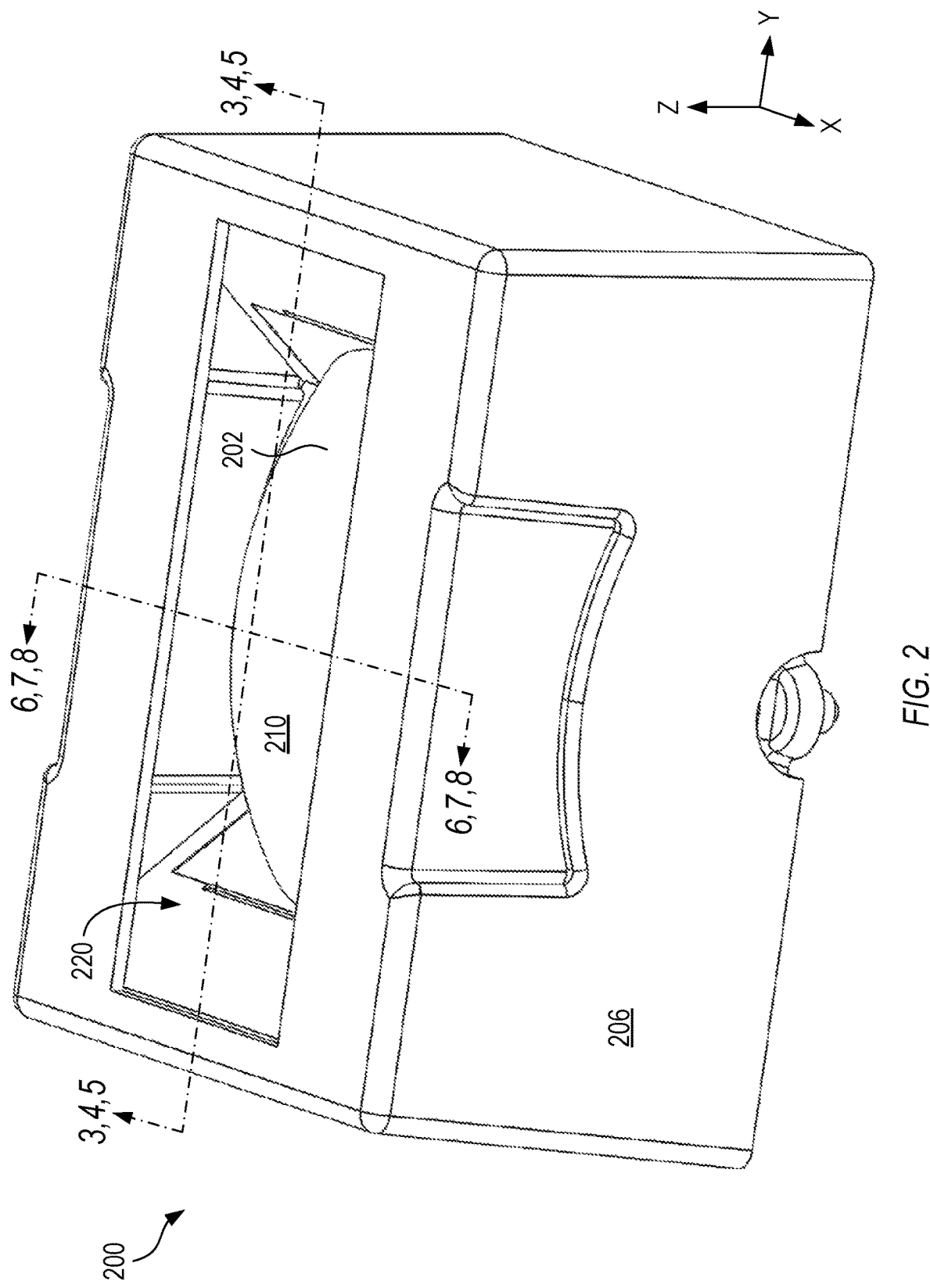
FIG. 2 shows an example of an imaging system, in accordance with some embodiments.
Figure 3:
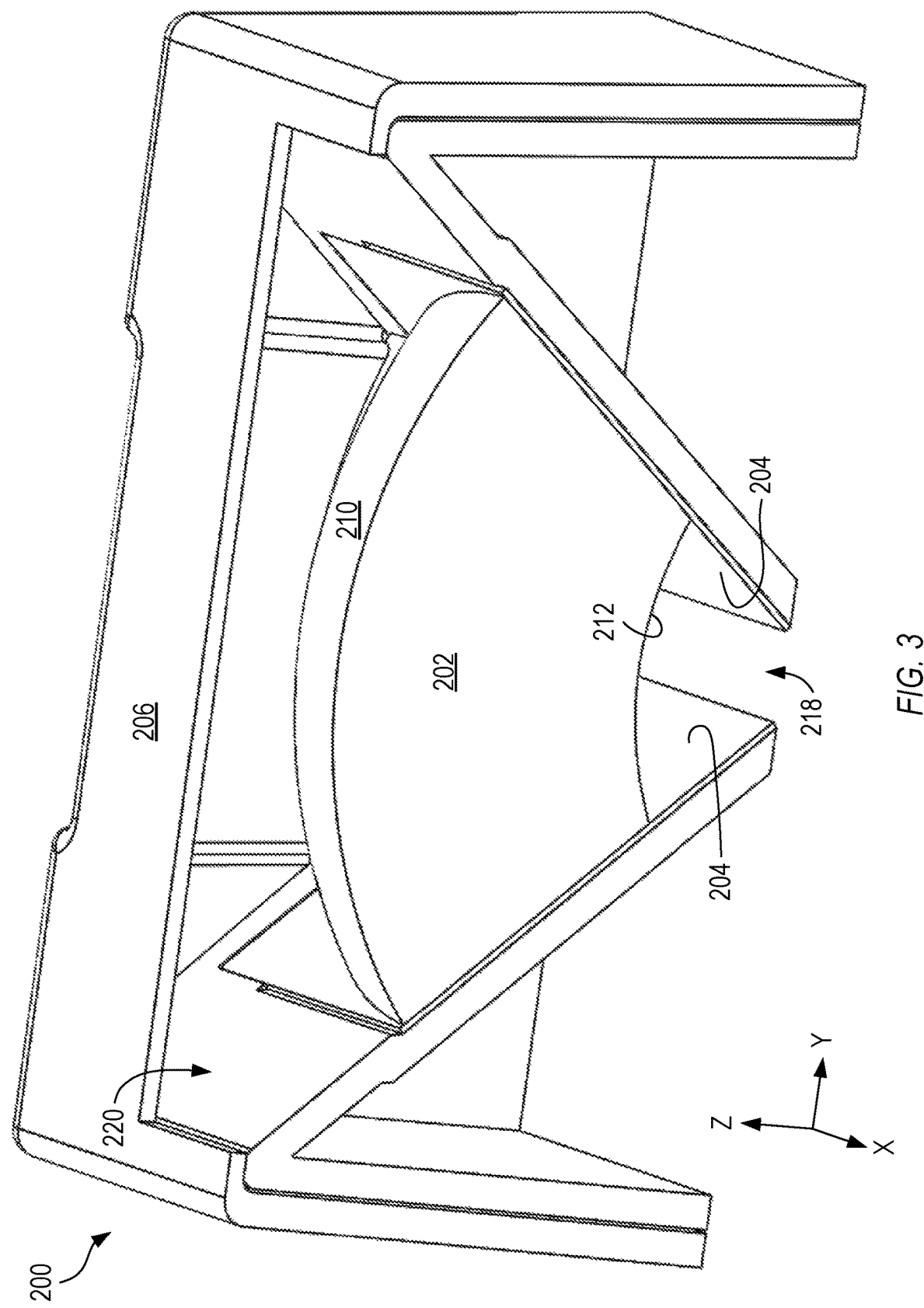
FIG. 3 shows a cross-section of the imaging system of FIG. 2, taken in a collection plane that includes an optical axis and is orthogonal to an imaging dimension, in accordance with some embodiments.
Figure 4:
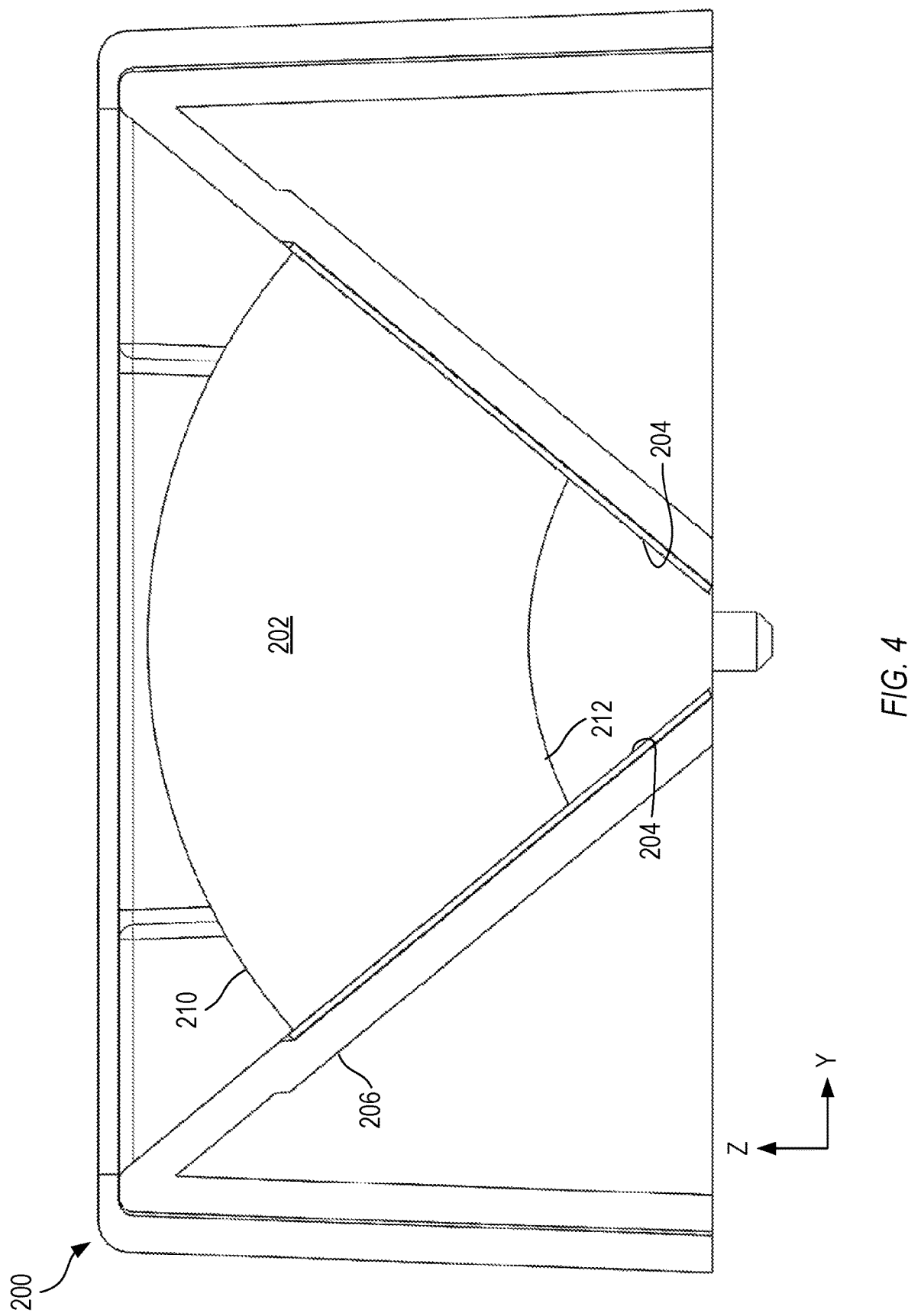
FIG. 4 shows a side view of the cross-section of FIG. 3, in accordance with some embodiments.
Figure 5:
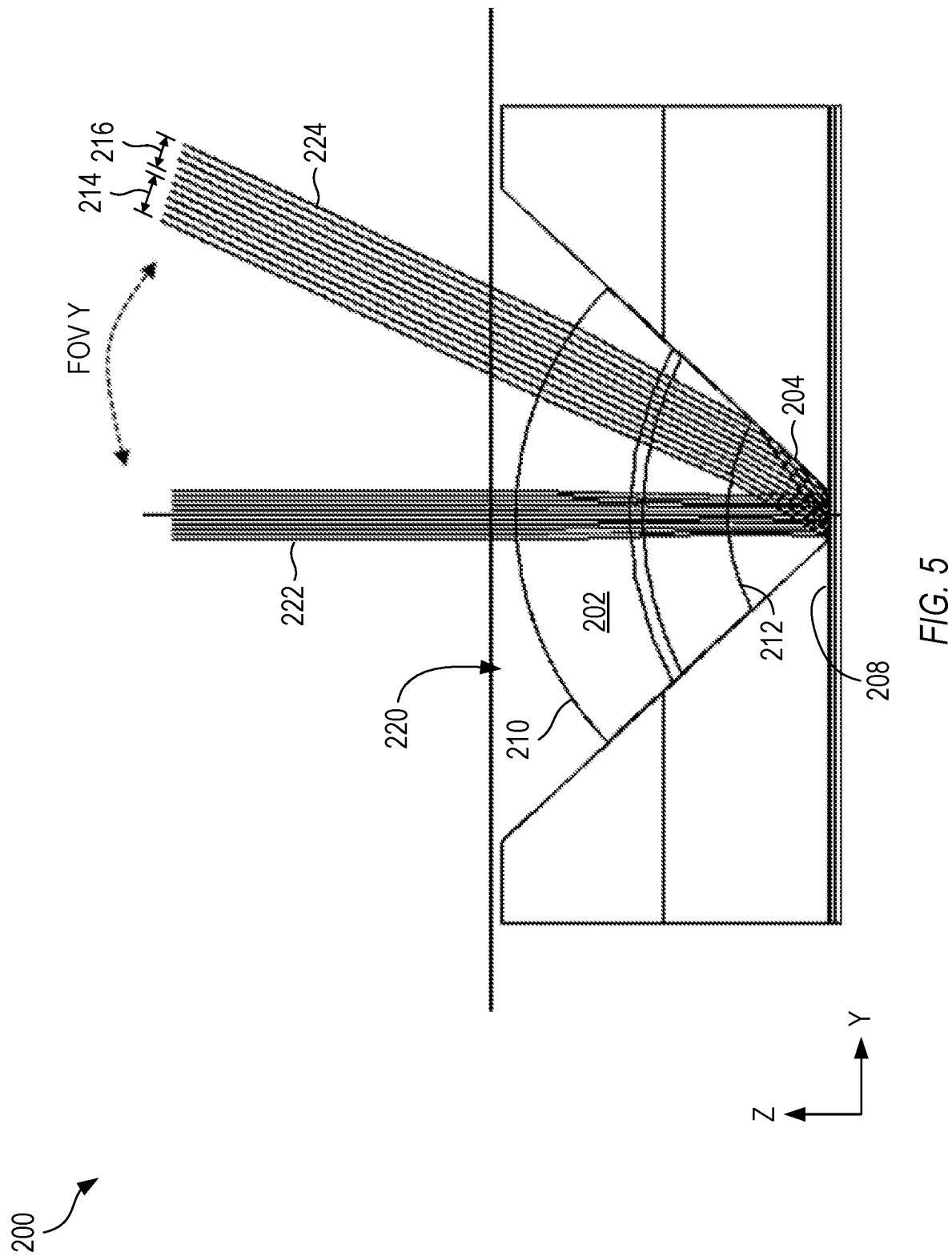
FIG. 5 shows an example of a ray trace of the imaging system of FIG. 2, shown in the side view of FIG. 4, in accordance with some embodiments.
Figure 6:
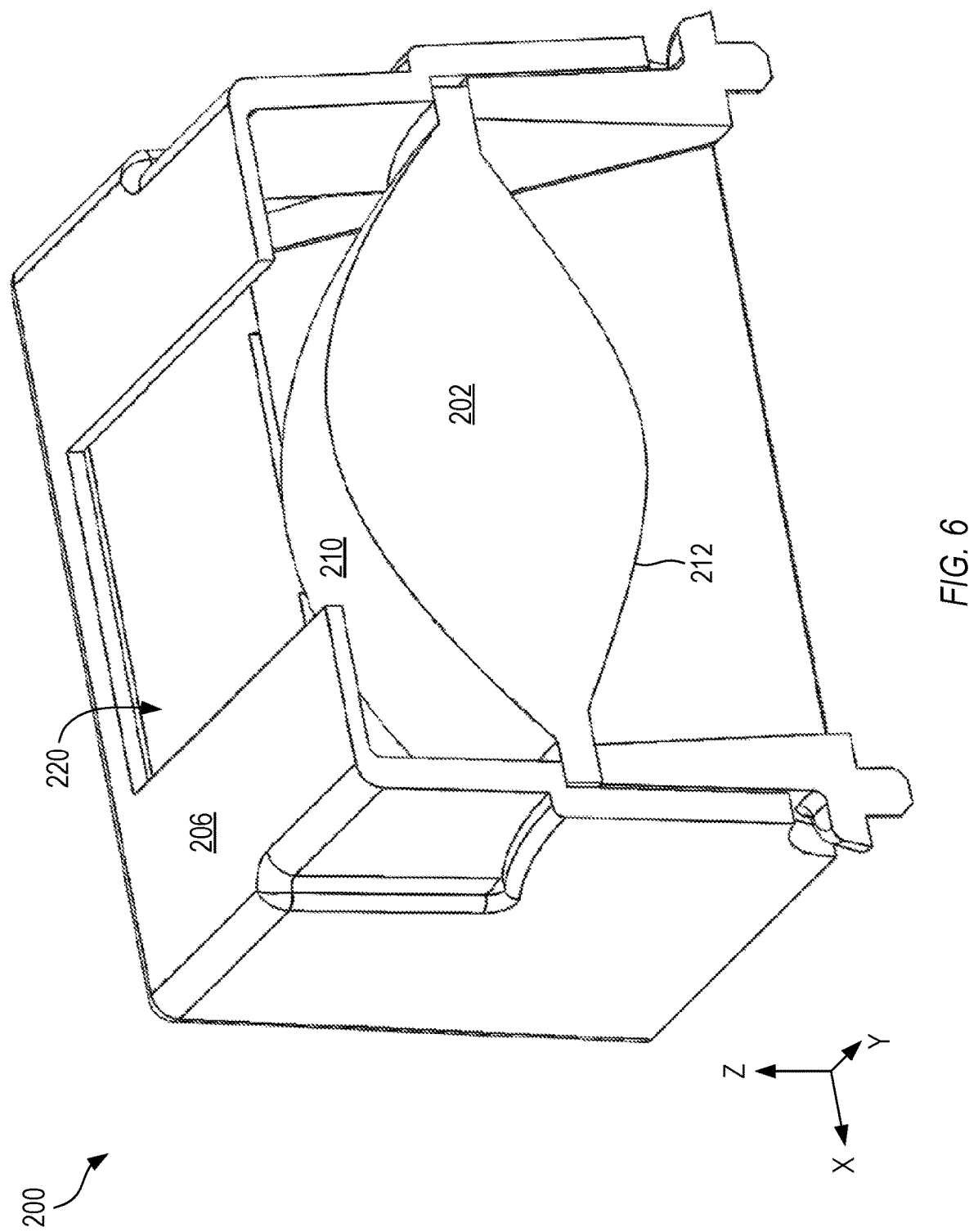
FIG. 6 shows a cross-section of the imaging system of FIG. 2, taken in an imaging plane that includes the optical axis and is parallel to the imaging dimension, in accordance with some embodiments.
Figure 7:
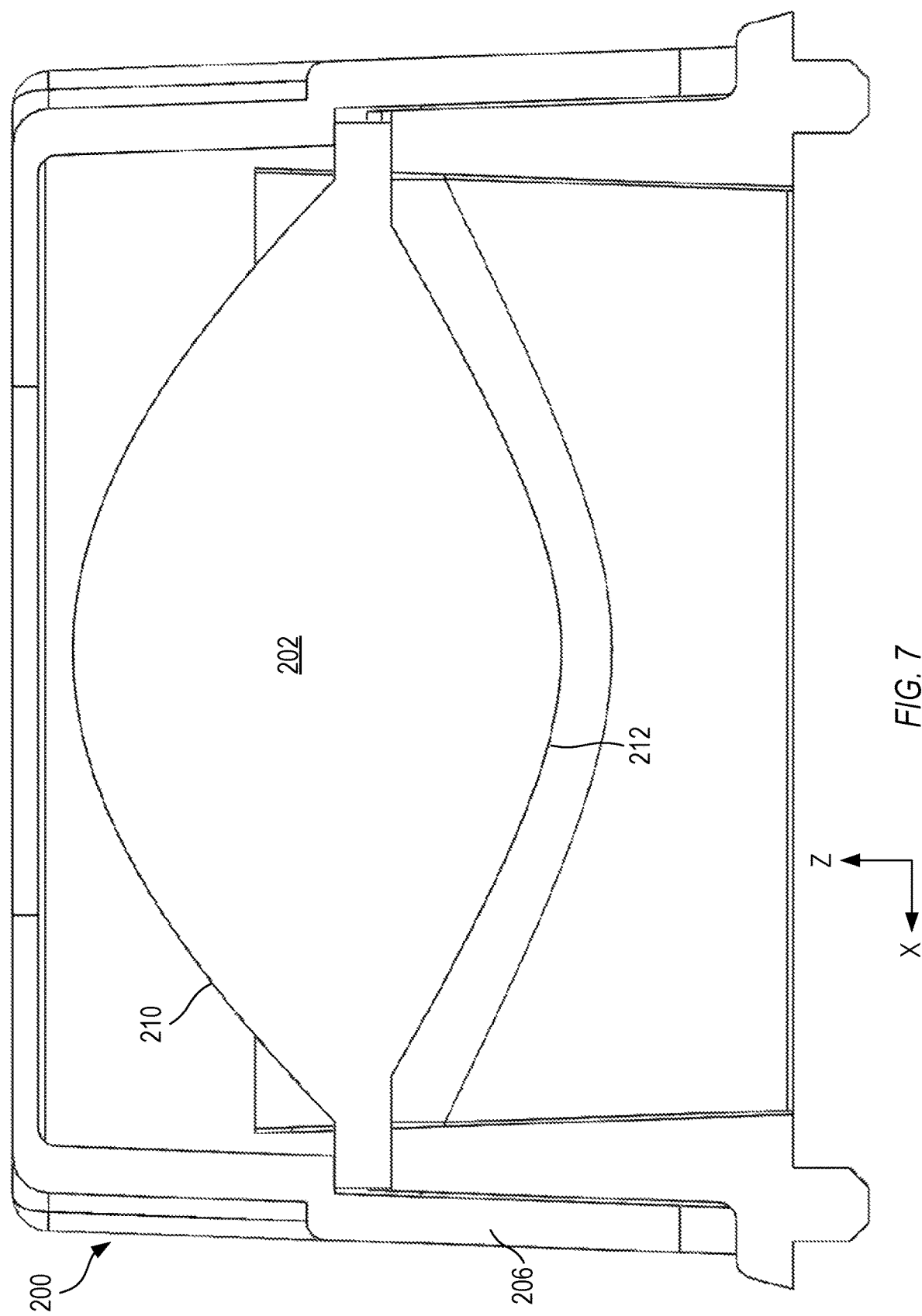
FIG. 7 shows a side view of the cross-section of FIG. 6, in accordance with some embodiments.
Figure 8:
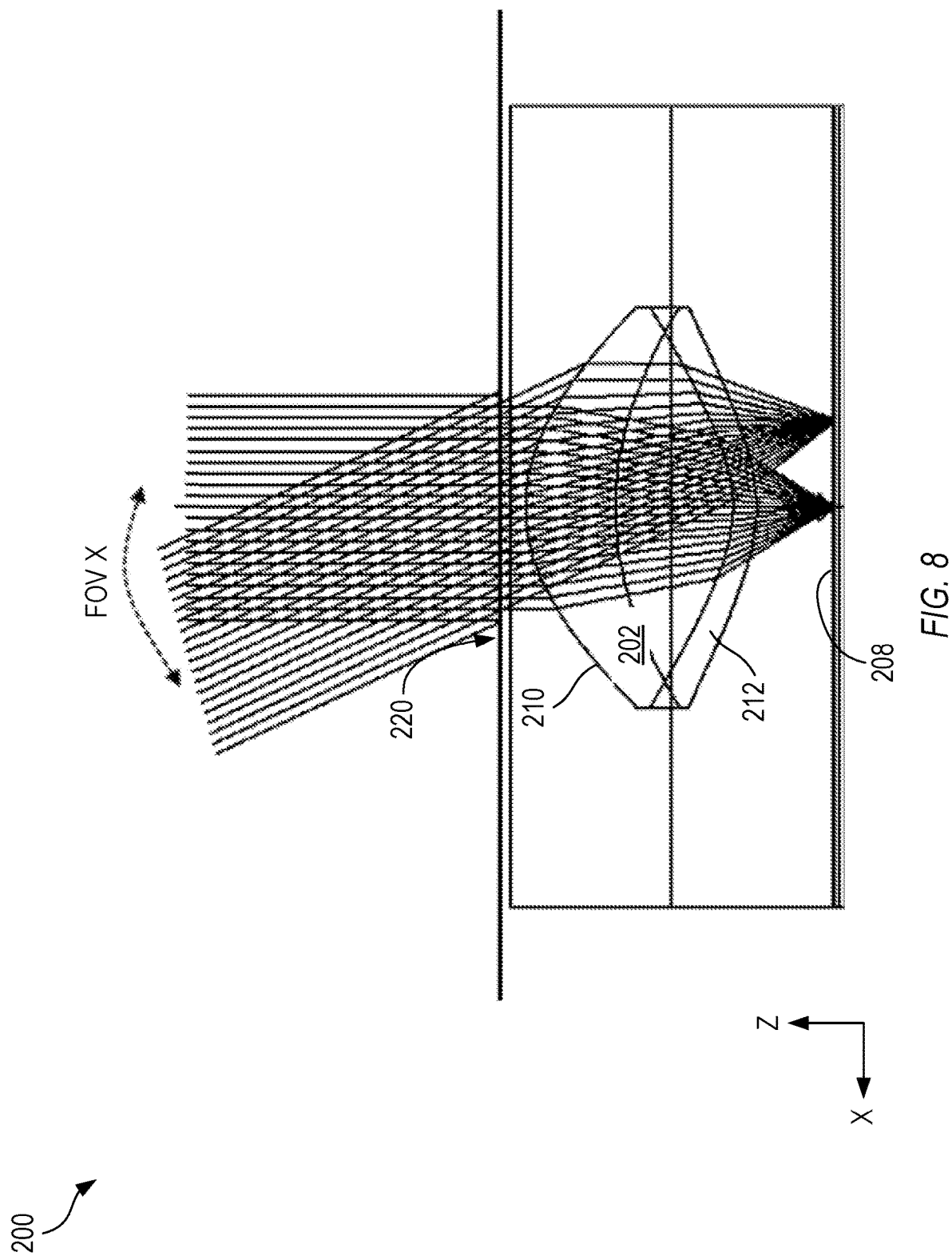
FIG. 8 shows an example of a ray trace of the imaging system of FIG. 2, shown in the side view of FIG. 7, in accordance with some embodiments.
Figure 9:
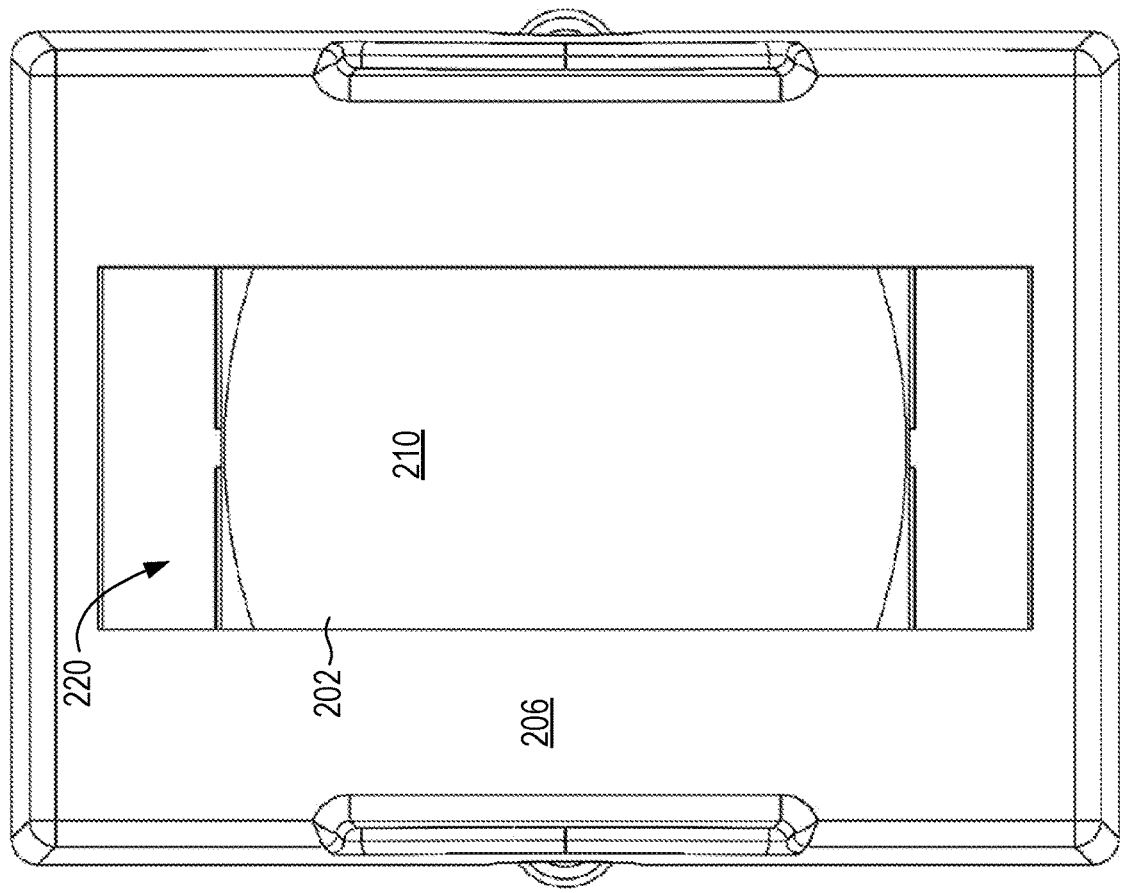
FIG. 9 shows a top view of the imaging system of FIG. 2, in accordance with some embodiments.
Figure 10:
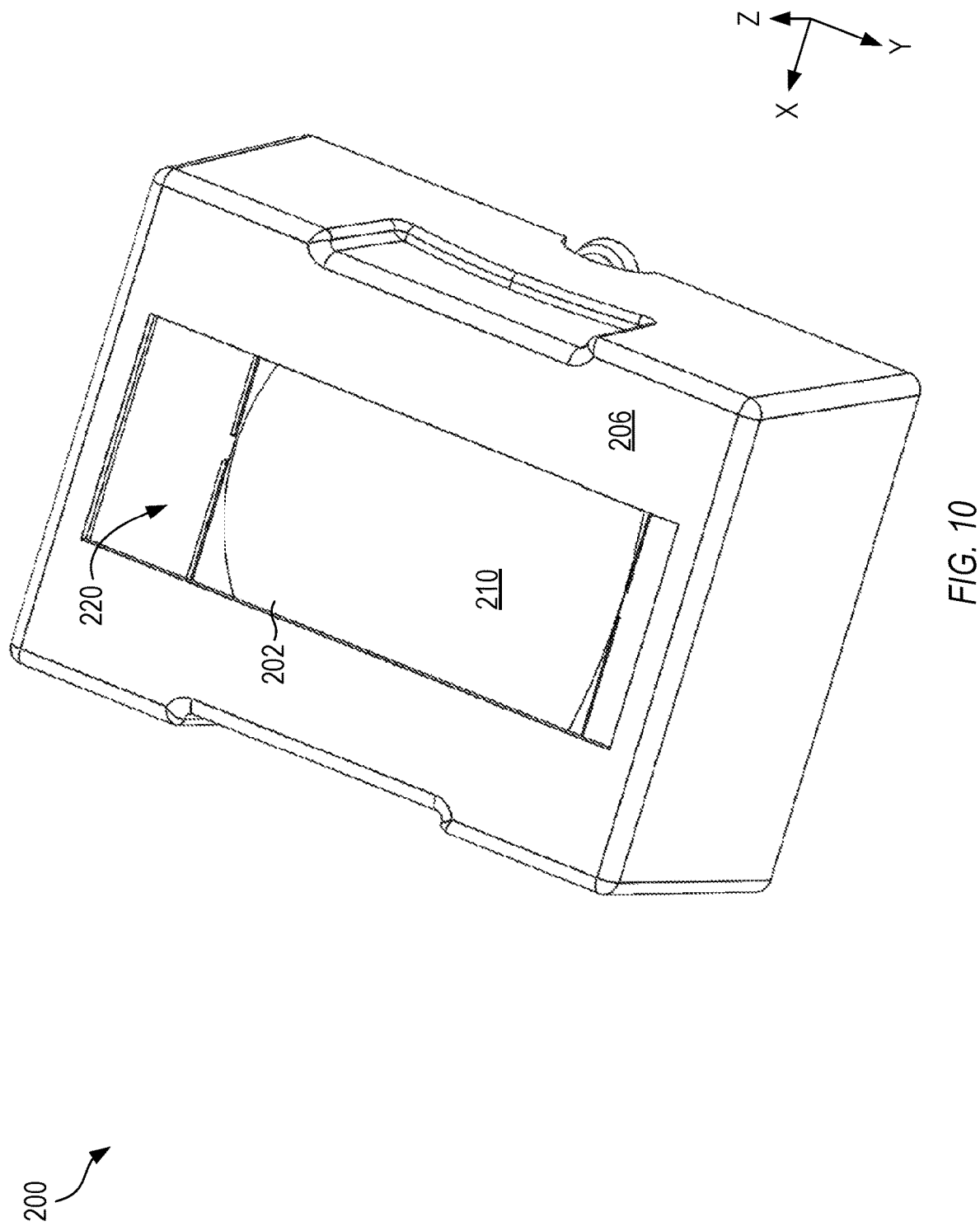
FIG. 10 shows a top perspective view of the imaging system of FIG. 2, in accordance with some embodiments.

FIG. 2 shows an example of an imaging system 200, in accordance with some embodiments. FIG. 3 shows a cross-section of the imaging system 200 of FIG. 2, taken in a collection plane (YZ) that includes the optical axis (Z) and is orthogonal to the imaging dimension (X), in accordance with some embodiments. FIG. 4 shows a side view of the cross-section of FIG. 3, in accordance with some embodiments. FIG. 5 shows an example of a ray trace of the imaging system 200 of FIG. 2, shown in the side view of FIG. 4, in accordance with some embodiments. FIG. 6 shows a cross-section of the imaging system 200 of FIG. 2, taken in an imaging plane (XZ) that includes the optical axis (Z) and is parallel to the imaging dimension (X), in accordance with some embodiments. FIG. 7 shows a side view of the cross-section of FIG. 6, in accordance with some embodiments. FIG. 8 shows an example of a ray trace of the imaging system 200 of FIG. 2, shown in the side view of FIG. 7, in accordance with some embodiments. FIG. 9 shows a top view of the imaging system 200 of FIG. 2, in accordance with some embodiments. FIG. 10 shows a top perspective view of the imaging system 200 of FIG. 2, in accordance with some embodiments.

A lens 202 can redirect light from an illuminated portion of a scene toward a one-dimensional focus that is positioned in a focal plane of the lens 202 and is elongated in an imaging dimension (X). In FIG. 2, the one-dimensional focus can be located near the bottom of the housing 206 and parallel to the X-axis. In FIG. 3, the one-dimensional focus can appear in a gap 218 between bottom edges of the reflectors 204. In FIG. 6, the one-dimensional focus can appear along the bottom edge.

The redirected light can include first light that emerges from the lens 202 and second light that emerges from the lens 202. As a specific example, FIG. 5 shows a ray trace in which two light bundles arrive from the scene. The scene can be considered to be relatively far from the lens 202, so that the two light bundles can be considered to be collimated or substantially collimated. In FIG. 5, a light bundle 222 passes through a center of the lens 202, parallel to the optical axis (Z), and strikes a center of the linear array of detector pixels. In FIG. 5, a light bundle 224 passes through the lens 202 close to an edge of the field of view of the lens 202. In this example, the light bundle 224 is wider (e.g., has a longer extent along the Y-axis) than the linear array of detector pixels. Because the light bundle 224 is wider than the linear array of detector pixels, some of the light bundle 224 (e.g., a leftmost portion 214 of the light bundle 224) strikes the linear array of detector pixels directly, while some of the light bundle 224 (e.g., a rightmost portion 216 of the light bundle 224) strikes the reflector 204, then is reflected by the reflector 204 onto the linear array of detector pixels. In this example, the leftmost portion 214 of the light bundle 224 can be considered to be the first light, while the rightmost portion 216 of the light bundle 224 can be considered to be the second light.

In some examples, the lens 202 can define an optical axis (Z) as extending through a center of the lens 202 to a center of the linear array of detector pixels. The optical axis (Z) is oriented vertically in FIGS. 2 through 8. Light reflects from the scene, propagates to the lens 202, and enters the lens 202 near the top of FIGS. 2 through 8, and propagates through the lens 202 downward toward the linear array of detector pixels. The linear array of detector pixels is not shown in FIGS. 2 through 8 but would be positioned near a bottom of FIGS. 2 through 8.

In some examples, the lens 202 can define an imaging plane (XZ plane) as including the optical axis (Z) and being parallel to the imaging dimension (X). FIGS. 6 through 8 show cross-sections taken through the imaging plane (XZ). In a cross-section that includes the imaging plane (XZ), the lens 202 can bring first collimated light that strikes the lens 202 to a focus at the focal plane 208. See, for example, the ray trace of FIG. 8.

In some examples, the lens 202 can define a collection plane (YZ plane) as including the optical axis (Z) and being orthogonal to the imaging dimension (Y). FIGS. 3 through 5 show cross-sections taken through the collection plane (YZ). In a cross-section that includes the collection plane (YZ), the lens 202 can direct second collimated light that strikes the lens 202 toward the focal plane 208 without forming a focus at the focal plane 208. See, for example, the ray trace of FIG. 5, noting that the light that strikes the linear array of detector pixels is not brought to a focus in this dimension.

The lens 202 can have an incident surface 210 facing away from the linear array of detector pixels. In some examples, the incident surface 210, in the cross-section that includes the imaging plane (XZ), can have a cross-sectional shape that is convex. See for example, FIGS. 6 through 8, which show the incident surface 210 in the cross-section that includes the imaging plane (XZ). In some examples, the incident surface 210, in the cross-section that includes the collection plane (YZ), can have a cross-sectional shape that is convex. See for example, FIGS. 3 through 5, which show the incident surface 210 in the cross-section that includes the collection plane (YZ).

The lens 202 can have an exiting surface 212 facing toward the linear array of detector pixels. In some examples, the exiting surface 212, in the cross-section that includes the imaging plane (XZ), can have a cross-sectional shape that is convex. See for example, FIGS. 6 through 8, which show the exiting surface 212 in the cross-section that includes the imaging plane (XZ). In some examples, the exiting surface 212, in the cross-section that includes the collection plane (YZ), can have a cross-sectional shape that is concave. See for example, FIGS. 3 through 5, which show the exiting surface 212 in the cross-section that includes the collection plane (YZ).

The lens 202 can have an imaging field of view (FOV X) for light in the imaging plane (see FIG. 8). The lens 202 can have a collection field of view (FOV Y) for light in the collection plane (see FIG. 5). In some examples, the imaging field of view can be different from the collection field of view. In other examples, the imaging field of view can equal the collection field of view.

A reflector 204 positioned adjacent the lens 202 can reflect the second light to form third light. In the specific example of FIG. 5, the light reflected from the reflector 204 can be considered to be the third light. In this example, the third light propagates diagonally away from the reflector 204, from the top-right to the bottom-left in FIG. 5.

A linear array of detector pixels can extend along the imaging dimension (X). In the specific example of FIG. 5, the linear array of detector pixels can be positioned at the bottom of FIG. 5 and extends into and out of the plane of FIG. 5.

The linear array of detector pixels can be positioned at the focal plane proximate the one-dimensional focus to receive the first light from the lens 202 and receive the third light from the reflector 204. Unlike typical imaging systems, the imaging system 200 discussed herein can include light from two different optical elements arriving at a same detector pixel. As a result, the detector pixels can collect more light than a comparable typical imaging system.

In some examples, each detector pixel can be positioned to receive at least some of the first light and at least some of the third light. For example, the one-dimensional focus can be wider than the linear array of detector pixels, for all detector pixels in the array.

In some examples, the linear array of detector pixels can be positioned to receive the first light directly from the lens 202, with no intervening optical elements, and receive the third light directly from the reflector 204, with no intervening optical elements. See, for example, FIG. 5.

In some examples, the reflector 204 can be positioned between a perimeter of the lens 202 and a perimeter of the linear array of detector pixels. See, for example, FIG. 3, which shows two reflectors 204, each extending from a perimeter of a lens 202 to the gap 218. The linear array of detector pixels can be positioned in the gap 218.

In some examples, the reflector 204 can have a cross-sectional shape that is generally invariant for a plurality of cross-sections that are orthogonal to the imaging dimension (YZ plane) and taken at a respective plurality of locations along the imaging dimension (X). In some of these examples, the reflector 204 can be generally flat (e.g., flat to within typical manufacturing and alignment tolerances) and can have a surface normal that is generally orthogonal (e.g., orthogonal to within typical alignment tolerances) to the imaging dimension (X). See, for example, FIG. 3. These conditions can help ensure that light in the one-dimensional focus is directed onto the correct detector pixel, and not directed onto an incorrect detector pixel.

In some examples, the housing 206 surrounds and mechanically support the lens 202, the reflector 204, and, optionally, the linear array of detector pixels. The housing 206 can include an aperture 220 that forms an aperture stop for the lens 202 in the imaging dimension (X). See, for example, the ray trace of FIG. 8. In some examples, the aperture can be elongated in a dimension (Y) generally orthogonal to the imaging dimension (X). See, for example, FIG. 2.

Figure 11:
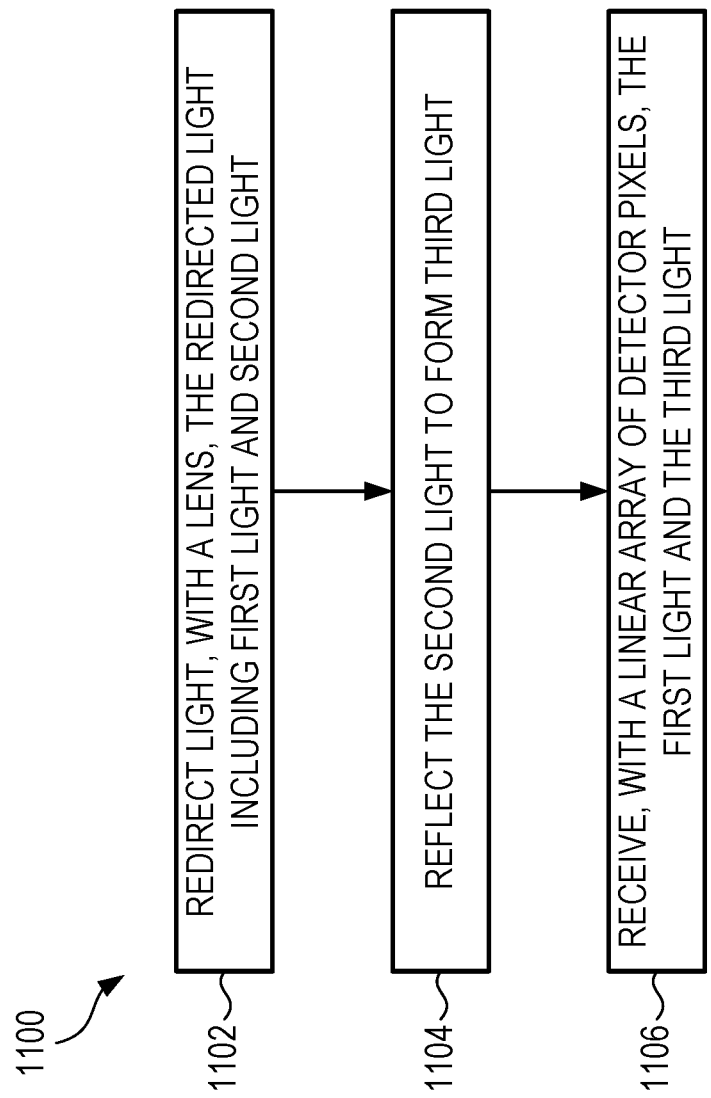
FIG. 11 shows a flow chart of an example of a method for operating an imaging system, in accordance with some embodiments.

FIG. 11 shows a flow chart of an example of a method 1100 for operating an imaging system, in accordance with some embodiments. In some examples, the method 1100 can be executed on the imaging systems 100, 200 of FIGS. 1 through 10. The method 1100 can be executed on other imaging systems, as well. The method 1100 of FIG. 11 is but one examples of a method for operating an imaging system; other suitable methods can also be used.

At operation 1102, a lens can redirect light from an illuminated portion of a scene toward a one-dimensional focus that is positioned in a focal plane of the lens and is elongated in an imaging dimension. The redirected light can include first light that emerges from the lens and second light that emerges from the lens.

At operation 1104, a reflector positioned adjacent the lens can reflect the second light to form third light.

At operation 1106, a linear array of detector pixels extending along the imaging dimension (X) and positioned at the focal plane proximate the one-dimensional focus can receive the first light from the lens and the third light from the reflector. In some examples, each detector pixel can receive directly from the lens, with no intervening optical elements, at least some of the first light and at least some of the third light.

While exemplary examples of the present disclosed subject matter have been shown and described herein, it will be obvious to those skilled in the art that such examples are provided by way of example only. Numerous variations, changes, and substitutions will now occur to those skilled in the art, upon reading and understanding the material provided herein, without departing from the disclosed subject matter. It should be understood that various alternatives to the examples of the disclosed subject matter described herein may be employed in practicing the various examples of the subject matter. It is intended that the following claims define the scope of the disclosed subject matter and that methods and structures within the scope of these claims and their equivalents be covered thereby.

What is claimed is:

1. An imaging system, comprising:
    a lens having a focal plane;
    a linear array of detector pixels located at the focal plane of the lens and extending along an imaging dimension, the lens defining:
        an optical axis that extends through a center of the lens to a center of the linear array of detector pixels;
        an imaging plane that includes the optical axis and is parallel to the imaging dimension; and
        a collection plane that includes the optical axis and is orthogonal to the imaging dimension,
    the lens configured to redirect light from an illuminated portion of a scene such that:
        in a first cross-section that includes the imaging plane, the lens is configured to bring the light to a focus at the focal plane; and
        in a second cross-section that includes the collection plane, the lens is configured to direct the light toward the focal plane without forming a focus at the focal plane,
    the redirected light including first light that emerges from the lens and second light that emerges from the lens; and
    a reflector positioned adjacent the lens and configured to reflect the second light to form third light, the linear array of detector pixels configured to receive the first light from the lens and receive the third light from the reflector.

2. The imaging system of claim 1, wherein each detector pixel is positioned to receive at least some of the first light and at least some of the third light.

3. The imaging system of claim 1, wherein the linear array of detector pixels is positioned to receive the first light directly from the lens, with no intervening optical elements, and receive the third light directly from the reflector, with no intervening optical elements.

4. The imaging system of claim 1, wherein the reflector is positioned between a perimeter of the lens and a perimeter of the linear array of detector pixels.

5. The imaging system of claim 1, wherein the reflector has a cross-sectional shape that is generally invariant for a plurality of cross-sections that are orthogonal to the imaging dimension and taken at a respective plurality of locations along the imaging dimension.

6. The imaging system of claim 1, wherein the reflector is flat and has a surface normal that is orthogonal to the imaging dimension.

7. The imaging system of claim 1, wherein:
the lens has an incident surface facing away from the linear array of detector pixels;
the incident surface, in the first cross-section that includes the imaging plane, has a cross-sectional shape that is convex; and
the incident surface, in the second cross-section that includes the collection plane, has a cross-sectional shape that is convex.

8. The imaging system of claim 1, wherein:
the lens has an exiting surface facing toward the linear array of detector pixels;
the exiting surface, in the first cross-section that includes the imaging plane, has a cross-sectional shape that is convex; and
the exiting surface, in the second cross-section that includes the collection plane, has a cross-sectional shape that is concave.

9. The imaging system of claim 1, wherein:
the lens has an imaging field of view for light in the imaging plane;
the lens has a collection field of view for light in the collection plane; and
the imaging field of view is different from the collection field of view.

10. The imaging system of claim 1, further comprising an illuminator configured to illuminate the portion of the scene, the illuminated portion occupying less than a full field of view of the lens.

11. The imaging system of claim 10, further comprising a controller configured to cause the illuminator to sequentially illuminate a plurality of portions of the scene.

12. The imaging system of claim 11, wherein:
the illuminator comprises an array of light-emitting diodes positioned proximate a focal plane of an illumination lens; and
the controller is configured to cause the illuminator to sequentially illuminate a plurality of portions of the scene by selectively powering specified light-emitting diodes in the array of light-emitting diodes.

13. The imaging system of claim 11, further comprising a processor coupled to the controller and configured to:
obtain one-dimensional image data from the linear array of detector pixels for each illuminated portion of the scene; and
construct data representing an image of the scene from the one-dimensional image data for the corresponding illuminated portions of the scene.

14. The imaging system of claim 13, further comprising:
a housing that surrounds the lens, the reflector, the linear array of detector pixels, the illuminator, the controller, and the processor,
the housing including an aperture that forms an aperture stop for the lens in the imaging dimension.

15. The imaging system of claim 14, wherein the aperture is elongated in a dimension generally orthogonal to the imaging dimension.

16. A method for operating an imaging system, the method comprising:
redirecting light, with a lens having a focal plane and defining an optical axis, from an illuminated portion of a scene such that:
in a first cross-section that includes the optical axis, the lens is configured to bring the light to a focus at the focal plane; and
in a second cross-section that includes the optical axis and is orthogonal to the first cross-section, the lens is configured to direct the light toward the focal plane without forming a focus at the focal plane,
the redirected light including first light that emerges from the lens and second light that emerges from the lens;
reflecting the second light, with a reflector positioned adjacent the lens, to form third light; and
receiving, with a linear array of detector pixels extending along the imaging dimension and positioned at the focal plane proximate the one-dimensional focus, the first light from the lens and the third light from the reflector.

17. The method of claim 16, wherein each detector pixel receives directly from the lens, with no intervening optical elements, at least some of the first light and at least some of the third light.

18. An imaging system, comprising:
a lens configured to redirect light from an illuminated first portion of a scene toward a one-dimensional focus that is positioned in a focal plane of the lens and is elongated in an imaging dimension, the redirected light including first light that emerges from the lens and second light that emerges from the lens, the lens defining:
an optical axis that extends through a center of the lens to a center of a linear array of detector pixels,
an imaging plane that includes the optical axis and is parallel to the imaging dimension, and a collection plane as including the optical axis and being orthogonal to the imaging dimension; and
the lens being shaped:
in a first cross-section that includes the imaging plane, to bring first collimated light that strikes the lens to a focus at the focal plane, and
in a second cross-section that includes the collection plane, to direct second collimated light that strikes the lens toward the focal plane without forming a focus at the focal plane;
a reflector positioned adjacent the lens and configured to reflect the second light to form third light;
the linear array of detector pixels extending along the imaging dimension, the linear array of detector pixels positioned at the focal plane proximate the one-dimensional focus to receive the first light from the lens and receive the third light from the reflector;
an illuminator configured to illuminate the first portion of the scene, the first portion occupying less than a full field of view of the lens;
a controller configured to cause the illuminator to sequentially illuminate a plurality of portions of the scene, the plurality of portions including the first portion; and
a processor coupled to the controller and configured to:
obtain one-dimensional image data from the linear array of detector pixels for each illuminated portion of the plurality of portions of the scene, and construct data representing an image of the scene from the one-dimensional image data for the plurality of portions of the scene.

19. The imaging system of claim 18, wherein:

the illuminator comprises an array of light-emitting diodes positioned proximate a focal plane of an illumination lens; and the controller is configured to cause the illuminator to sequentially illuminate a plurality of portions of the scene by selectively powering specified light-emitting diodes in the array of light-emitting diodes.

* * * * *